United States Patent Office 2,844,620
Patented July 22, 1958

2,844,620

PROCESS FOR THE DEODORIZATION OF O,O-DIMETHYL-DITHIOPHOSPHATE OF DIETHYL MERCAPTOSUCCINATE

Juan Nebrera Escobar, Madrid, Spain

No Drawing. Application August 1, 1955
Serial No. 525,777

Claims priority, application Spain May 21, 1955

2 Claims. (Cl. 260—461)

The present application is a continuation-in-part of co-pending application Serial No. 513,571, filed June 6, 1955, for a process for the deodorization of o,o-dimethyl-dithio-phosphate of diethyl mercapto-succinate, which consisted in deodorizing the latter by treating it with an energetic oxidizing agent, such as a hypochlorite, and preferably sodium hypochlorite.

The o,o-dimethyl-dithio-phosphate of diethyl mercapto-succinate, when treated in accordance with the process of the said co-pending application, is deprived of its offensive smell, without loss of any of its original active insecticidal properties. In this state it can also be utilized advantageously for the preparation of products applicable for the destriction of pests in closed spaces. Examples of such products are the domestic insecticides.

Recent experiences have established that when, at the time of submitting the o,o-dimethyl-dithio-phosphate of diethyl mercapto-succinate to the oxidizing action of the hypochlorite solution, a current of dry air, saturated with a mixture of nitrobenzene and amyl acetate, is passed into the liquid mass, this will result in a more concentrated mixture of the reactive substances due to the intense emulsion produced thereby, and will thus facilitate the expulsion of the final vapors that are produced. Upon completion of the process, the original smell of the o,o-dimethyl dithio-phosphate of diethyl mercapto-succinate will have been completely removed, so that the treated product can thereafter be packed, without having lost any of its original active properties, and will furthermore remain stable during storage.

The present improved process thus consists in submitting the o,o-dimethyl dithio-phosphate of diethyl mercapto-succinate, in an appropriate container, to the oxidizing action of a hypochlorite solution, preferably utilizing to this effect sodium hypochlorite, which is added thereto gradually while the liquid mass is agitated by a current of dry air under pressure that has previously passed through a mixture of nitrobenzene and amyl acetate. The reaction produced thereby will naturally raise the temperature; however, the injected air will eventually regulate same until it drops to room temperature.

The dry air that is passed into the mixture of o,o-dimethyl dithio-phosphate of diethyl mercapto-succinate and hypochlorite, will give rise to a considerable stirring action which, as has aleady been stated, will produce a more concentrated mixture of the reactive substances and will thereby more efficiently eliminate the final vapors that are produced.

After having accomplished the first phase of the treatment, which should not take less than two hours, and when the mixture has cooled down to room temperature, the o,o-dimethyl dithio-phosphate of diethyl mercapto-succinate is removed from the decomposed hypochlorite and suspended decomposition products, by a centrifugal process or by any other appropriate means providing a similar effect.

The o,o-dimethyl dithio-phosphate of diethyl mercapto-succinate thereby recovered, is submitted to another treatment with dry air saturated with the aforementioned mixture of nitrobenzene and amyl acetate, so as to eliminate therefrom the last traces of vapors contained in the mass and furthermore to free same from residual moisture produced by the foregoing treatment. The duration of this phase is in proportion to the liquid mass under treatment; however, a complete deodorization can generally be achieved after a treatment of about four hours.

The resultant product is now finished and ready to be mixed with inert vehicles, or to be dissolved in water according to the formulation which is conventional for o,o-dimethyl dithio-phosphate of diethyl mercapto-succinate.

Hereinafter, the process for deodorization of the o,o-dimethyl dithio-phosphate of diethyl mercapto-succinate, according to the present invention, will be illustrated by means of a non-limiting example of practical realization.

In an appropriate container having an enamelled or vitrified bottom, there are placed 100 parts of o,o,-dimethyl dithio-phosphate of diethyl mercapto-succinate, while pouring over same in a controlled, but continuous manner, 50 parts of an aqueous sodium hypochlorite solution containing from 47 to 50 parts by volume of hypochlorite per thousand parts by volume of solution, and passing a current of dry air under pressure into the liquid mass. The said dry air is previously passed through a mixture of nitrobenzene and amyl acetate.

The process is maintained for a duration of about two hours until the reaction has been accomplished and the liquid mass has acquired room temperature. All gases given off during this reaction should be conducted to the open air.

Thereafter the o,o-dimethyl dithio-phosphate of diethyl mercapto-succinate is recovered by eliminating the decomposed hypochlorite together with the amorphous substances in suspension, by means of a centrifugal process or any other means ensuring the same effect.

The recovered o,o-dimethyl dithio-phosphate of diethyl mercapto-succinate is then placed in another perfectly dry and clean vitrified or enamelled container, and submitted to a second agitation with dry air that is previously enriched with nitrobenzene and amyl acetate vapors, conducting said air to the bottom of the container in which the o,o-dimethyl dithio-phosphate of diethyl mercapto-succinate is deposited.

The current of air is maintained at the same pressure for about four hours according to the volume of technical material utilized, thus producing a considerable emission of vapors which carry off the remaining traces of offensive smells. The liquid mass of active substance will become more crystalline as the current of air removes the remaining traces of moisture.

What I claim is:

1. A process for the deodorization of odoriferous O,O-dimethyl dithio-phosphate of diethyl mercapto-succinate which comprises subjecting the odoriferous O,O-dimethyl dithio-phosphate of diethyl mercapto-succinate to the oxidizing action of sodium hypochlorite by gradually adding an aqueous sodium hypochlorite thereto while simultaneously passing through the reaction mixture a current of dry air under pressure until substantially all volatile vapors have been liberated, said dry air being saturated with a mixture of nitrobenzene and amyl acetate, and liberated volatile vapors being passed to the atmosphere, thereafter cooling the reaction mixture to ambient temperature ,and separating the resultant deodorized O,O-dimethyl dithio-phosphate of diethyl mercapto-succinate from said reaction mixture.

2. A process according to claim 1, wherein the separated O,O-dimethyl dithio-phosphate of diethyl mercapto-succinate is again subjected to the action of a current of nitrobenzene- and amylacetate-saturated dry air passed therethrough, whereby any residual traces of undesired volatile impurities and of moisture are eliminated therefrom.

References Cited in the file of this patent

UNITED STATES PATENTS

| | | |
|---|---|---|
| 2,578,652 | Cassaday | Dec. 18, 1951 |
| 2,713,018 | Johnson | July 12, 1955 |